Nov. 1, 1955  A. S. VAN HALTEREN  2,722,290
FULL FLOATING BRAKE DRUM

Filed Jan. 21, 1949  2 Sheets—Sheet 1

Inventor
ANDREW S. VAN HALTEREN

Attorneys.

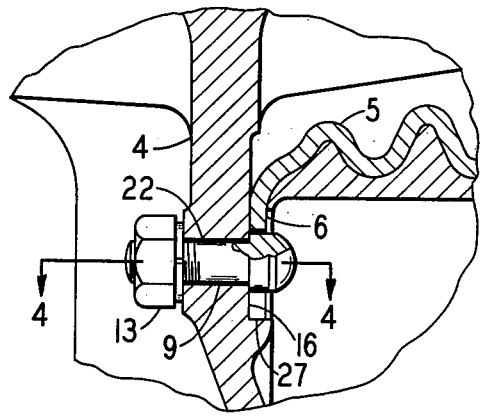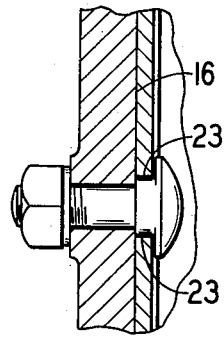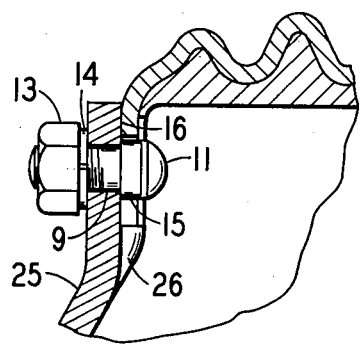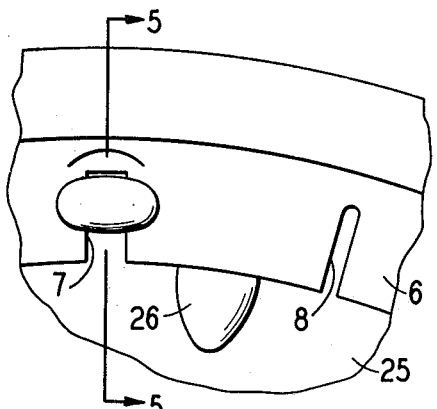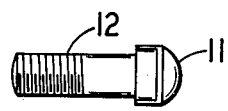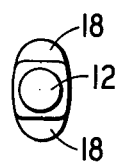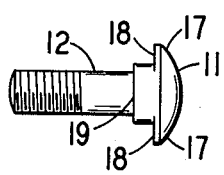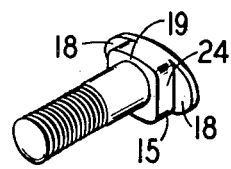

United States Patent Office 2,722,290
Patented Nov. 1, 1955

2,722,290

FULL FLOATING BRAKE DRUM

Andrew S. Van Halteren, Lansing, Mich., assignor to Motor Wheel Corporation, Lansing, Mich., a corporation of Michigan Application January 21, 1949, Serial No. 72,047

4 Claims. (Cl. 188—218)

This invention relates to brake drums and more particularly to brake drums having internal braking surfaces.

Under maximum brake loads, particularly in the case of airplane brake drums, it is estimated that the drum temperature runs in the neighborhood of 1200° F. Therefore, it is essential that the drum should expand freely under the influence of such heat. If the drum cannot expand freely and independently of the back support for the drum ring, then objectionable bell mouthing of the drum will result and further internal localized wear on the drum and brake lining will also be produced.

This invention contemplates a brake drum which will permit bearing of the lining against the drum ring to approach one hundred percent (100%) contact throughout the stop when the brake lining is applied to the drum and which will not bell mouth.

These objects are accomplished by making the brake drum ring full floating, that is, free to expand readily with respect to the drum back or drum support under expansion caused by heat or mechanical load such as occurs when the brakes are applied to bring the vehicle to a stop.

This invention also contemplates a floating brake drum structure which is simple, practical, efficient in operation and economical to manufacture.

In the drawings:

Fig. 3 is an enlarged section, in fact full size, taken through the bolt attaching the drum ring to the wheel.

Fig. 4 is a section taken on the line 4—4 of Fig. 3.

Figs. 5 and 6 are section and elevation, respectively, of a mounting of a full floating drum ring onto a drum back instead of mounting it onto a wheel directly, Fig. 5 being taken on the line 5—5 of Fig. 6.

Fig. 7, 8 and 9 are conventional detail views of the bolt used to attach the drum ring to a wheel or back.

Fig. 10 is an isometric view of the bolt.

Figure 1:
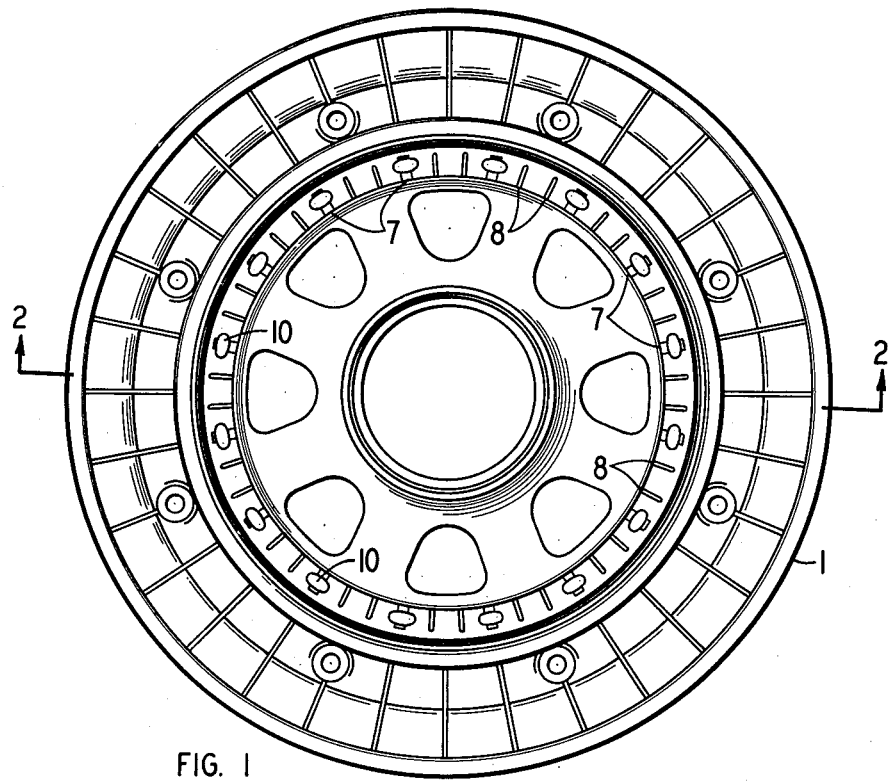
Fig. 1 is an elevation of an airplane wheel having a full floating drum mounted on the same.

Referring more particularly to the drawings, there is shown, by way of example, an airplane wheel 1 comprising a rim portion 2, a hub portion 3 and a body portion 4.

The full floating annular brake drum or closed ring 5 is mounted on the wheel body. The flange 6 of the brake drum is provided with a plurality of circumferentially spaced radially extending wide slots 7 which serve as spline-ways. The brake drum flange 6 is also provided with a pair of narrow radial slots 8 between each pair of wider slots 7. These slots, which are cut into the brake drum flange, allow the brake ring 5 to expand more uniformly.

The wheel body 4 or support to which the drum is attached, is provided with a plurality of round or circular openings 9 which are arranged or axially aligned with the wider spline slots 7. The brake drum is secured to the wheel body by a plurality of bolts generally designated 10 and, by way of illustration, sixteen of these bolts are used to secure the brake drum to the wheel body.

Each bolt comprises a head 11, neck 15, and a stem 12. The stem of each bolt passes through opening 9 in the wheel body and is held in place by means of a nut 13 and lock washer 14. The lock washer 14 is not essential but is dsirable. In order to pass airplane specifications it is necessary that the nut be drawn up tightly on the bolt. The bolts 10 are usually drawn up or torqued to a point which is just below the elastic limit of the bolt at the root of the thread. The necks 15, which are rectangular and preferably square in cross-section, constitute splines having a sliding fit in slots 7 and which cooperate with the sides of splined slots 7 to drive the drum, that is, transfer braking torque from drum 5 to wheel body 4. The bolt head 11 may exert a slight axial pressure against the flange 6 sufficient to prevent the drum 5 from axial movement but it is not necessary that the bolt head exert pressure against the drum flange because the sides of the square neck on the bolt serve to furnish all the torque or drive necessary between the brake drum 5 and wheel body 4.

Each bolt head is provided with a pair of wings 17 each of which is provided with a flat bearing surface 18 on the underside of the bolt head or wings 17 which may, but not necessarily, bear against the radial flange 6 of the drum ring. The axial distance or space between the flattened ends or bearing surfaces 18 of each bolt head and the face 19 of neck 15 is preferably slightly greater than the thickness of the brake drum flange 6 and may be as much as thirty thousandths of an inch greater. This will prevent excessive tightness if the face 19 sinks into the wheel or supporting structure when the bolt is tightened.

It should be noted that there is a slight clearance 22 between each opening 9 and the stem 12 of each bolt and, what is more important, there is a slight clearance 23 (preferably between a line to line fit to .015 of an inch loose fit) between the sides 24 of neck 15 of each bolt and the side of each slot 7 to allow movement between brake drum flange 6 and neck 15.

Figure 2:
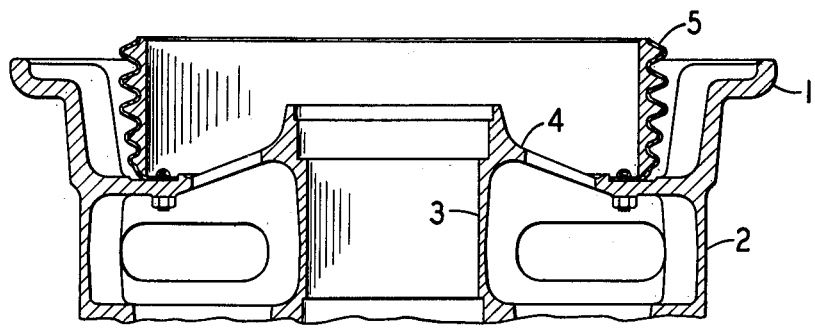
Fig. 2 is a cross section through Fig. 1 on the line 2—2 thereof showing that part of the wheel to which the drum is attached.

In Figs. 5 and 6, I have shown my brake drum mounted upon a drum back 25 which is provided with a plurality of circumferentially spaced stops 26 which allow the drum ring to be centered on the drum back preparatory to using the brake drum. These projections 26 serve the same purpose as the shoulder 27 on the wheel body, Fig. 3. The only difference between the structure shown in Figs. 5 and 6 and that shown in Figs. 1 to 4 is that the brake drum is mounted upon a drum back rather than upon a wheel body 4. The same bolts and mounting arrangement are used in each case. The length of the bolt will vary according to the thickness of the supporting member. Rivets having heads and shoulders like those shown on the bolts may be used in place of the bolts if desired when a drum back is used.

With my splined drive arrangement for attaching the brake drum to its support, I make possible a one hundred percent (100%) contact or bearing of the brake lining against the braking face of the drum throughout each stop and this not only improves the life and performance of the brake drum but also permits the weight of the brakes to be reduced appreciably. Further, my radially floating brake drum will not bell mouth because the braking ring (owing to spline drive 7, 15) is free to expand uniformly due to heat and pressure throughout its entire width, that is, the brake ring 5 can expand just as freely at the closed end where it is attached to the wheel, as at the opposite or open end.

I claim:

1. A brake drum assembly comprising in combination a braking ring having an annular flange, a plurality of radial spline-ways in said flange member, a drum support overlapping said flange and having a plurality of openings therein aligned with said spline-ways and a plurality of bolts for securing said flange and drum support together and transmitting braking torque from the flange to the drum support, each bolt extending through an aligned spline-way in the flange and an opening in the drum support and having a head which overlaps said flange, each bolt also having a spline portion positioned axially adjacent said head, said spline portion having a sliding fit in a cooperating spline-way on said flange, and having an axial extent slightly greater than the thickness of said flange, said spline portion being of greater cross sectional area than the shank of the bolt and having at the axial end face thereof remote from said head a flat bearing face forming a flat shoulder extending in a plane transversely of the axis of the bolt, said flat shoulder being seated against the adjacent face portion of said drum support which surrounds said openings and means securing said bolt to said drum support in said seated position.

2. The brake drum assembly claimed in claim 1 wherein the spline portion of each bolt is provided with parallel sides which have a sliding fit with the cooperating parallel sides of its respective spline-way.

3. The brake drum assembly claimed in claim 2 wherein the spline-ways in the flange take the form of a plurality of radial slots which facilitate uniform expansion of the flange and ring.

4. A brake drum assembly comprising in combination a braking ring having an annular flange, a plurality of radial spline-ways in said flange member, a drum support overlapping said flange and having a plurality of openings therein aligned with said spline-ways and a plurality of bolts for securing said flange and drum support together and transmitting braking torque from the flange to the drum support, each bolt extending through an aligned spline-way in the flange and an opening in the drum support and having a head which overlaps said flange, each bolt also having a spline portion positioned axially adjacent said head, said spline portion having a sliding fit in a cooperating spline-way on said flange, and having an axial extent slightly greater than the thickness of said flange, said spline portion being of greater cross sectional area than the shank of the bolt and having at the axial end face thereof remote from said head a flat bearing face forming a flat shoulder extending in a plane transversely of the axis of the bolt, said flat shoulder being seated against the adjacent face portion of said drum support which surrounds said openings, the spline portion of each bolt being provided with parallel sides which have a sliding fit with the corresponding parallel sides of its respective spline-way, said spline-ways being in the form of a plurality of radial slots which facilitate uniform expansion of the flange and ring and including means for holding the bolt in longitudinal tension comprising a nut screwed onto the threaded end of the bolt shank.

References Cited in the file of this patent

UNITED STATES PATENTS

| | | |
|---|---|---|
| 1,135,770 | Cornfield | Apr. 13, 1915 |
| 1,214,713 | Potter | Feb. 6, 1917 |
| 1,296,275 | Firth | Mar. 4, 1919 |
| 1,423,241 | Minshull | July 18, 1922 |
| 1,481,396 | Ternes | Jan. 22, 1924 |
| 1,690,151 | Woodbury | Nov. 6, 1928 |
| 1,874,574 | Morgan | Aug. 30, 1932 |
| 2,088,191 | Eksergian | July 27, 1937 |
| 2,176,204 | Caya | Oct. 17, 1939 |
| 2,311,528 | Freer | Feb. 16, 1943 |
| 2,485,993 | Van Halteren | Oct. 25, 1949 |